(12) United States Patent
Mauer

(10) Patent No.: US 8,147,890 B1
(45) Date of Patent: Apr. 3, 2012

(54) SAMPLE PRESSED FOOD SYSTEM AND METHOD OF OPERATION

(76) Inventor: James E. Mauer, Rome, GA (US)

(*) Notice: Subject to any disclaimer, the term of this patent is extended or adjusted under 35 U.S.C. 154(b) by 748 days.

(21) Appl. No.: 12/256,105

(22) Filed: Oct. 22, 2008

(51) Int. Cl.
*A23G 3/02* (2006.01)

(52) U.S. Cl. ........ 426/512; 426/231; 425/195; 425/574; 425/572; 425/190; 425/192 R; 425/183; 425/556; 264/39

(58) Field of Classification Search .................. 426/231, 426/512; 425/195, 574, 572, 190, 192 R, 425/183, 556; 264/39; 249/DIG. 4
See application file for complete search history.

(56) References Cited

U.S. PATENT DOCUMENTS

| | | | | |
|---|---|---|---|---|
| 3,887,964 A | * | 6/1975 | Richards | 425/556 |
| 4,356,595 A | * | 11/1982 | Sandberg et al. | 426/512 |
| 4,372,008 A | * | 2/1983 | Sandberg | 425/562 |
| 4,821,376 A | * | 4/1989 | Sandberg | 425/562 |
| 4,996,743 A | * | 3/1991 | Janssen | 425/236 |
| 6,517,340 B2 | * | 2/2003 | Sandberg | 425/572 |
| 6,572,360 B1 | * | 6/2003 | Buhlke et al. | 425/572 |
| 6,713,111 B1 | * | 3/2004 | Tournour et al. | 426/512 |
| 2002/0192328 A1 | * | 12/2002 | Kennedy et al. | 425/572 |
| 2003/0075055 A1 | * | 4/2003 | Tournour et al. | 99/427 |
| 2008/0233230 A1 | * | 9/2008 | Sandberg et al. | 425/190 |

* cited by examiner

*Primary Examiner* — Rena Dye
*Assistant Examiner* — Chaim Smith
(74) *Attorney, Agent, or Firm* — Stephen J. Stark; Miller & Martin PLLC

(57) ABSTRACT

A method of testing pressed food product operational characteristics of a food processor having a press as a portion of a processing line as contemplated. Specifically, the test mold station provides a mold plate having at least one cavity less than an operational mold cavity and has spacers having a combined width greater than a width of the test mold plate.

13 Claims, 4 Drawing Sheets

SAMPLE PRESSED FOOD SYSTEM AND METHOD OF OPERATION

FIELD OF THE INVENTION

The present invention relates to a sample pressed food system and method of its operation, and more particularly to a component in a food processing system which presses food products into desired shapes in cavities using a mold plate during normal operation as well as after modification to provide a sample mold station which provides fewer products per stroke than would normally be provided with an operational mold, but still providing the same pressed shape as is anticipated would be provided in the operational run so that the other components of food processing step can be verified for settings prior to running larger normal quantities of food through the system.

BACKGROUND OF THE INVENTION

The U.S. Department of Agriculture (USDA) currently allows food processors the ability to run no greater than 500 pounds of processed food in a sample run to verify processing settings before having to stop the equipment and either run another sample run at no greater than 500 pounds or run an operational run.

One component of many food processing steps includes a forming system which is effectively a press which presses a food product into a plurality of shaped cavities and then extracts those shaped food products at rates often exceeding 60 strokes a minute such as about 90 strokes a minute or more. If a mold has half a dozen cavities, one can quickly see that over 500 products per minute can be extracted from such a press. Often presses are run in parallel to provide products to a common transportation system for further processing downstream.

Current patty formers such as those made by FORMAX™ Industry often provide a 27 inch wide press platform at a mold station. On this press platform are two narrow spacers which have an approximate width of less than 2 inches each. A width of a mold plate sitting between the two spacers is at least 23 inches and has a number of cavities therein for operational use. However, when performing a 500 pound sample, the cavities relatively rapidly press out the 500 pounds This may prevent the operator from being able to adequately verify all the necessary settings of the remainder of the equipment in the food line both upstream and downstream. Such equipment may relate to application of seeding or other process upstream or in various downstream applications frying, cooking, battering or breading and/or other process.

Accordingly, a need exists to utilize the existing press equipment to provide a smaller quantity of food product per cycle of the press so that the 500 pound sample can be extended through a sample run.

SUMMARY OF THE INVENTION

It is a present object of the present invention to provide an improved system for running test runs through a food press to provide desired food products to verify settings of both upstream and downstream components prior to running operational runs at normal operational speeds and outputs from the press.

It is another object of the present invention to provide an improved modification to an operational press for test runs.

It is still another object of the present invention to provide an improved system for testing food product lines which include a pressed food product which is normally provided in multiple quantities upon operation of cycles of the press.

In accordance with a presently preferred embodiment of the present invention, a press such as a FORMAX™ press having about a 27 inch wide press area is modified for test runs from running operational runs. Specifically, the normal spacers utilized in normal operation are normally less than about 2 inches wide each are removed and replaced with wider width spacers which, in the presently preferred embodiment, are about 10 inches wide and have receivers which receive ears of a significantly narrower test mold plate than the operational mold plates normally utilized with the press. In fact, the test mold plate is smaller in width than the combined width of two test spacers. In a presently preferred embodiment the width of the test mold plate is about the same width as a single test spacer test if not smaller than a single test spacer.

Above the test mold plate is a test breather plate and possibly a test filler plate whereby the test mold plate and the test breather plate, and if utilized, a test filler plate, provide a combined height of approximately that of the test spacers (i.e., normally slightly shorter than test spacers to provide for clearance for the mold plate to reciprocate relative to the test spacer which is secured in place relative to the press so that the test mold plate can move the cavity to be located in and out relative to a knock out which can punch out pressed food products from the cavities preferably onto a conveyor for further processing downstream). Upstream such activities such as seeding and other applications may occur prior to providing product to the press to then be pressed into a desired food configuration as a pressed food article. Downstream such activities can occur such as cooking by various methods such as frying, etc., possibly after battering, breading, etc. By providing the test mold plate having a cavity with fewer cavities than the operational mold plate, but with at least some of the same configuration, then the processing of the pressed food product can be utilized to verify the setting of downstream as well as upstream so that the finished food product as it leaves the food processor can be adequately tested with the 500 pounds as currently allowed by USDA for a test run with the test mold station.

This has been found useful in many embodiments to eliminate a need to run multiple test runs with the operational mold plate as is a current practice in the industry.

Furthermore, once the test spacers are obtained, then if the food processor is providing multiple products, then only additional test mold plates and possibly test breather plates, test filler plates, need to be obtained along with a test knock out so that product can be relatively easily and quickly tested with the operational settings of upstream and downstream components to verify settings without a need to first run operational runs through the operational mold plate. Of course, additional test spacers can be obtained in other embodiments.

This has been found particularly helpful for a new product testing system so that the expense of manufacture of an operational mold plate need not be entertained in the current market which run anywhere from $1,400 to $10,000. A 10 inch wide test plate might be as inexpensive as $200 to $300 or maybe slightly more. The shape of the cavity or cavities including height, width and length may need to be varied through the testing process since it is estimated that normal shrinkage from the unit front to back is 20% while normal width shrinkage is 5% of product after downstream processing. The thickness may also affect parameters such as how well the product cooks through. It can be easily seen that testing before ordering operational mold plates may be a particularly attractive option for many food processing manufacturers. Accordingly, processing systems such as the applicant's test system are believed to be a particularly attractive option which saves food processors money and time while preferably satisfying a single test sample run to meet the objective as a USDA sample training guidelines.

BRIEF DESCRIPTION OF THE DRAWINGS

The particular features and advantages of the invention as well as other objects will become apparent from the following description taken in connection with the accompanying drawings in which.

DETAILED DESCRIPTION OF THE DRAWINGS

Figure 1:
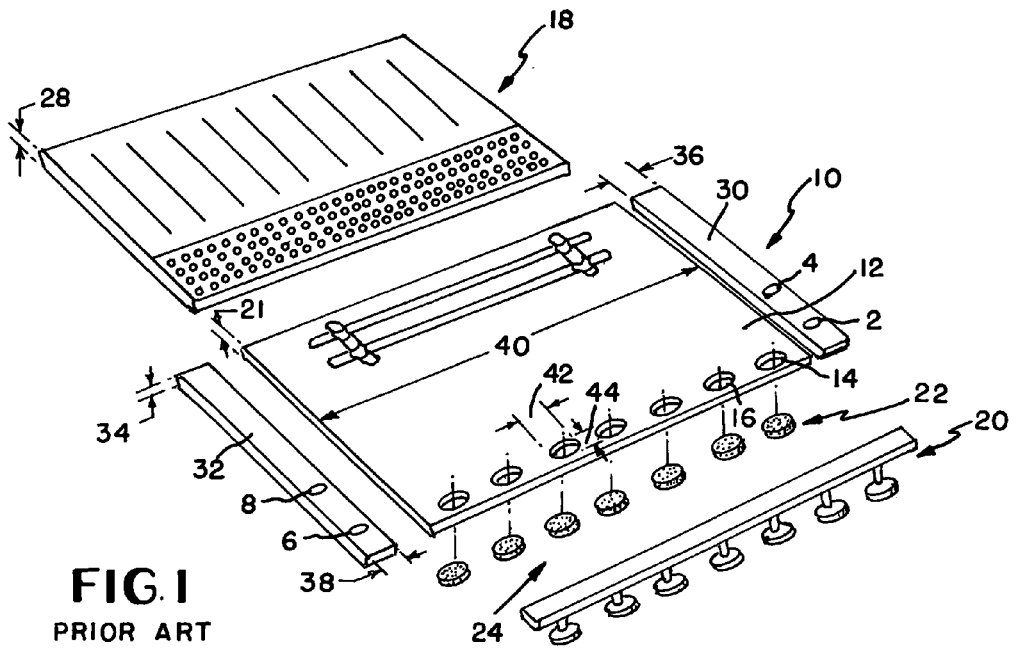
FIG. 1 is an exploded view of a prior art mold station with a mold showing a mold plate spacer and punch.

FIG. 1 shows components from a prior art operational mold station 10 in an exploded view. This mold station is taken from a FORMAX™ patty former machine in which food is introduced from below mold plate 12 into a plurality of cavities 14,16, etc. A breather plate 18 is disposed thereon on top to allow air from the cavities 14,16, etc., to escape therefrom as well as the possibility of additional food product to pass therethrough during the pressing step, then the mold plate 12 is laterally reciprocated and knock out punch 20 ejects pressed food articles 22,24 therefrom. The mold plate 12 has a height 26 and the breather plate has a height 28 with a combined height of the mold plate 26 and breather plate 28 being slightly less than a height of spacers 30,32 which is represented by height 34. This allows enough room for the mold plate 12 to be reciprocated to align the cavities with the punch 20 for the ejection of the pressed food product 22,24.

The spacers 30,32 have a relatively narrow width 36,38 and in the known embodiments, these widths are less than 2 inches each while the width of the mold plate 12 is shown as width 40 is roughly about 23 inches for a combined width of about 27 inches. Manufacturing of the mold plate 12 is a relatively expensive process for most providers providing replacement mold plates 12 at $1,400 to $10,000 depend upon the complexity of the cavities 14,16. Furthermore, when developing new pressed food items, it is often the case where the height 26 or other shape of the cavities 14,16 it is at least partially experimentally derived based on the downstream processing steps which could involve providing a product through a boiling oil for some period of time, or through an oven for a set period of time, freezing, etc. The height may affect the cooking of internal portions. Furthermore, the volume which would have a width 42 as well as a length 44 may need to be adjusted because shrinkage in most pressed applications as it relates to length and the length 44 direction can be as much as 20% while the shrinkage in the width direction 42 is normally 5% which creates a dramatically different finished product once further processing is complete. Accordingly, selection of the shape of the cavities 14,16 can be particularly important and, unfortunately, often experimentally derived.

In order to minimize the expense of creation of $1,400 to $10,000 mold plates 12, the applicant has developed a test mold station 50 to work on the same press as the mold station 10 works of the prior art. Specifically, spacers 52,54 have a significantly wider width 56,58 than prior art spacers. In fact, the combined widths 56,58 are greater than the width 60 of the test mold plate 62 which is not the case in the prior art and would not be the case in prior art presses. Test mold plate 62 has at least one cavity 64 and preferably has at least one less cavity than an operational mold plate 12 and more preferably significantly fewer cavities 64 but preferably of a generally similar shape as the mold plate 12 of a configuration that is finally determined often based on the results of test mold plate 62. In fact, in the presently preferred embodiment, the widths 56,58 of each of spacers 52,54 is roughly the same width as width 60 of mold plate 62 and, in fact, width 60 is slightly less than the width 56,58 of a single spacer 52,54. In the presently preferred embodiments, the spacers 52,54 have widths 56,58 are approximately 10.88 inches of the mold plate 60 as a width 60 or approximately 10 inches.

Test breather plate 66 has a slightly different configuration than that of operational breather plate 18 in that it has ears 68,70,72,74 to be received in receivers 76,78,80,82 in the spacers 52,54. Similarly, filler plate 84, if utilized, also has similar ears 86 which can be received in the various receivers 76,78,80,82. Once again, the combined heights 88,90,92 of the test mold plate 88, the test breather plate 90 and the test filler plate 92, if utilized, are at slightly less than the height 94 of the spacers 52,54 to allow for the reciprocation of the test mold plate 62 in and out of the press station relative to punch 96 to eject pressed food article 98 for further processing.

Figure 7:
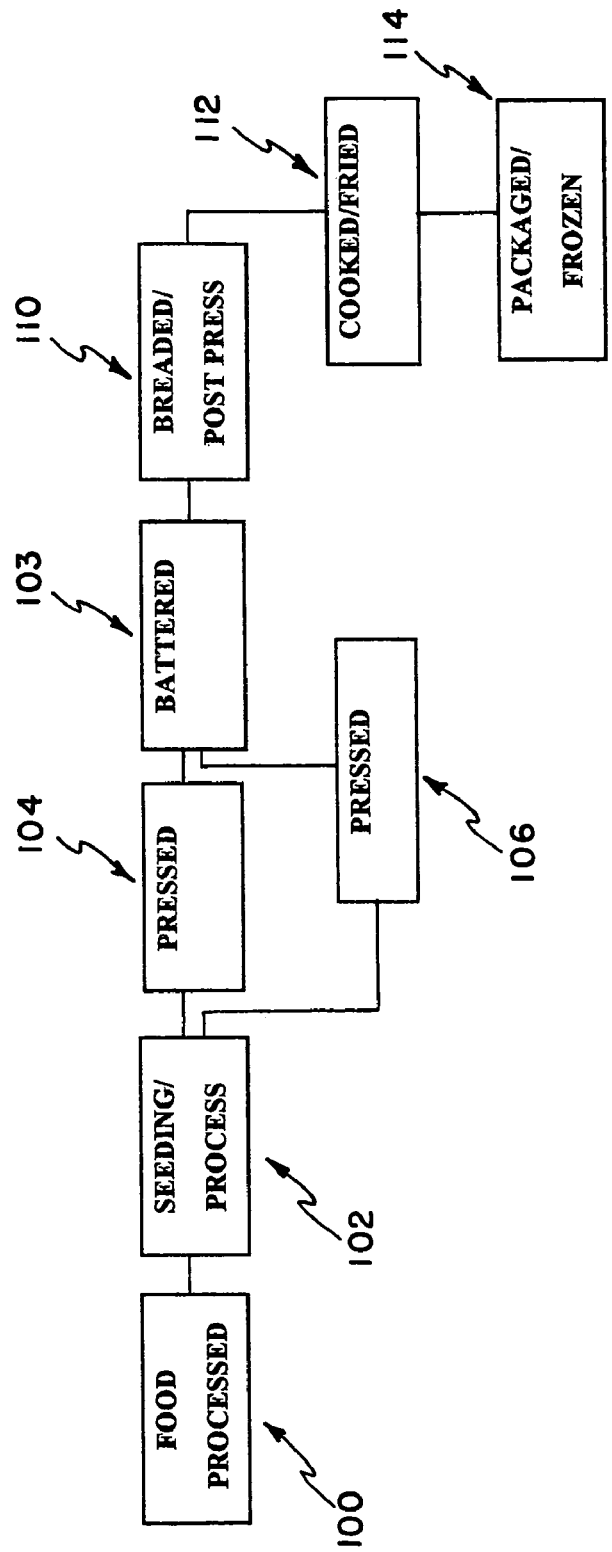
FIG. 7 is a schematic view of a food press in a food processing line as contemplated in use with the method shown and described in the present preferred embodiment of the present invention using the embodiments of FIGS. 2-6 in operation.

In the context of USDA current rules which allow for testing a 500 pound sample for a sample run the test mold station of no more than 50 is preferable. By decreasing the number of cavities 54 significantly per stroke operation of the punch 96, significantly less pressed product can be provided at a single time thereby allowing the remainder of the food system such as that shown in FIG. 7 to be verified as it relates to settings. Food processing such as grinding of meat in step 100 or other food processing steps such as thawing meat or processing an animal into meat in step 100 can then be seeded in step 102 with herbs, flavorings or other pre-pressing process at step 102 such as combining with other ingredients. Other pre-press steps may also occur upstream before the food material is then fed into the mold station 50 before pressing at steps 104 and 106. Steps 104 and 106 are shown as being in parallel so that multiple presses can feed and expedite the amount of material processed during a normal operation of a food processing line.

It may be that one of the presses 104,106, if utilized or provided, are secured during the operational and/or test runs. Next, if battering is done at step 108, then it can be performed as well as possible breading of products such as breading of chicken nuggets, chicken fried steak, etc., or other postpressed process can be performed. Next, it may be likely that many food products are cooked at step 112 such as by frying or other process. Then at step 114 a post-press food article can either be frozen and/or packaged at step 114. Other post press steps can also occur as would be known by one of ordinary skill in the art of the food processing industry.

In testing a new pressed configuration such as from the test mold station 50, when the test mold station 50 replaces an operational mold station 10, at least one of the presses 104, 106, each of the various settings of all the other processes steps may be verified to ensure that the product in a sample run meets expectations. Specifically, it may be desirable to verify that the meat is cooked through and has the desired amount of breading, battering, and other possibilities that may be controlled by the food processor during the run. By utilizing the test station 50 with significantly less meat being processed per stroke, the amount of time until the exhaustion of the 500 pound sample is expended, and/or the amount of material utilized during a test run is significantly decreased thereby contributing to the efficiency of changing from one product run to another. Furthermore, if new cavity 64 shapes are to be tested, testing one or a few at a time rather than a full mold plate such is mold plate 12 at a time, is believed to be desirable in order to save expenses by a food processor.

Figure 2:
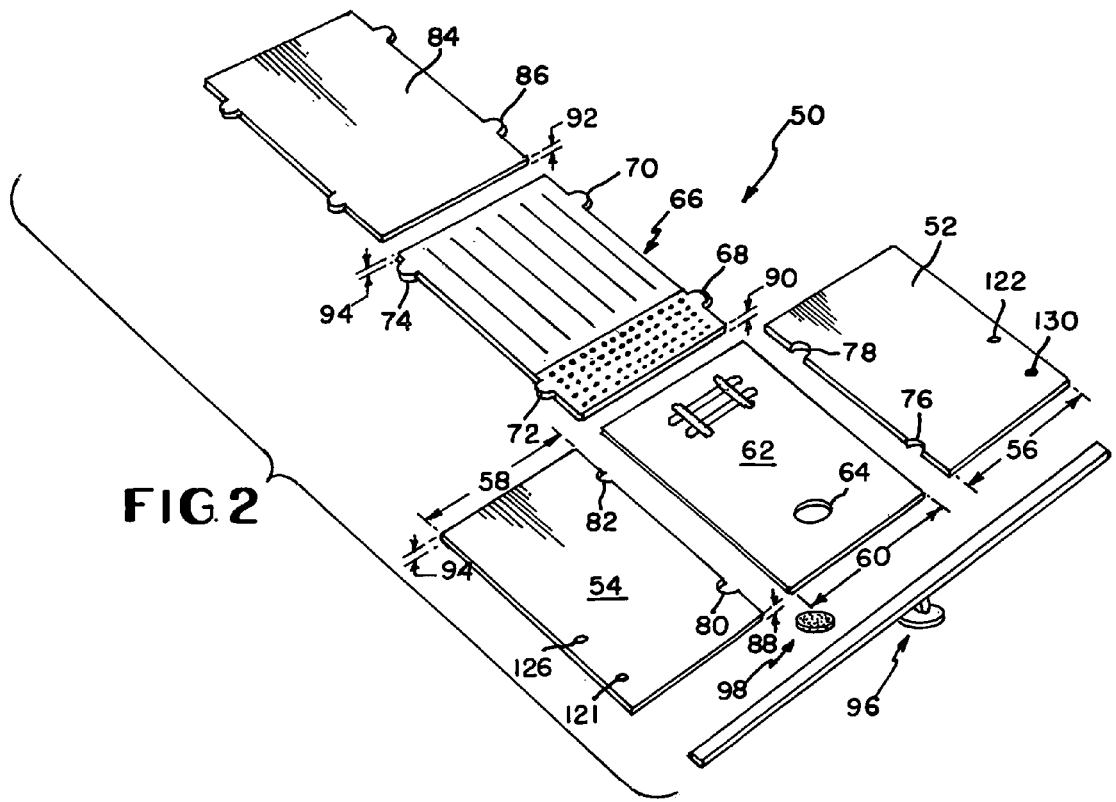
FIG. 2 is an exploded view of a mold station of the presently preferred embodiment of the present invention.
Figure 3:
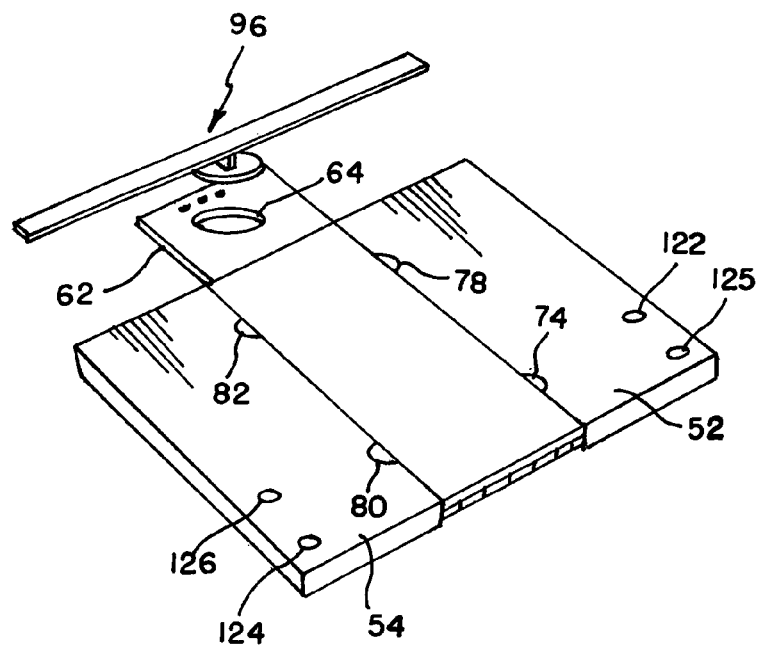
FIG. 3 is a top perspective view of the presently preferred embodiment of a test mold station in operation.
Figure 4:
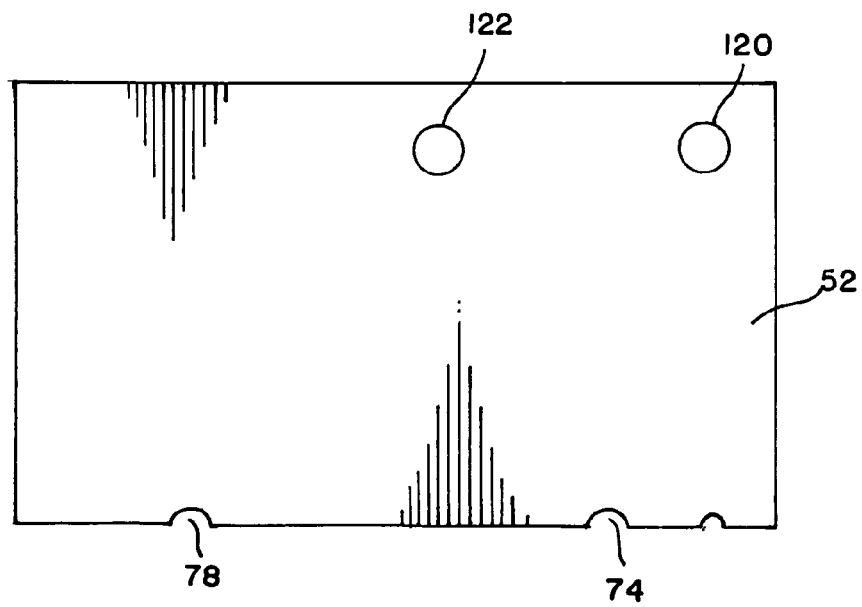
FIG. 4 is a top plan view of a spacer shown in FIGS. 2 and 3.
Figure 5:
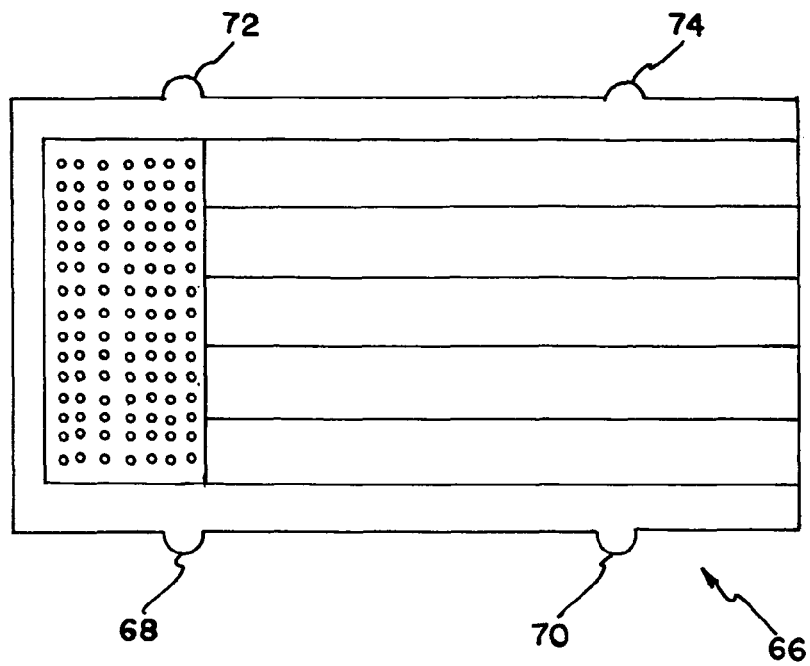
FIG. 5 is a top perspective view of a breather plate as shown in FIGS. 2 and 3.
Figure 6:
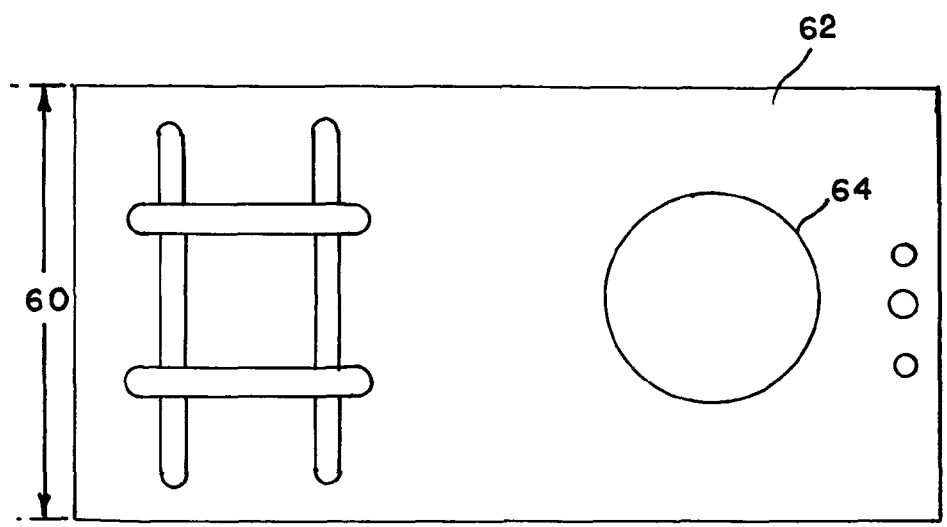
FIG. 6 is a top perspective view of a test mold plate as shown in FIGS. 2 and 3.

FIG. 3 shows the test mold plate 62 ejected relative to the spacers 52,54 prior to punch 96 just after ejecting a food component 98 (not shown in FIG. 3 but shown in FIG. 2) from the cavity 64. Cavity 64 is illustrated as being round but can take any shape such as a chicken leg, chicken breast, patty, nugget, or other shape. Even a plurality of these various configurations or other configurations as would be known by one of ordinary skill in the art could be provided. Furthermore, although a single row is consistently shown in the drawings of FIGS. 1 and 2, it would be understood that there could be multiple rows of cavities 14,16,64 in both the operational mold station 10 as well as the test mold station 50.

FIG. 3 shows the ears 68,70,72,74 as well as 86 and a respective receivers 76,78,80,82 as would be understood by reference from FIG. 2 to FIG. 3. Bores 2,4,6,8 in the operational spacers 30,32 receive bolts from the press 104,106 as do bores 120,122,124,126 in test spacers 52,54.

In operation, it is anticipated that the operational mold station will be disassembled from the press 104 and the test spacers 52,54 are placed thereon. Then the test mold plate 62, test breather plate 64 as well as test filler plate 84 will be utilized. Then a separate run can be provided once the settings are placed at their expected locations from the upstream and downstream components. When the settings are verified both upstream and downstream, then the test mold station 50 can be removed and replaced with operational mold station 10. An operational run can then be commenced with the normal high volume as it relates to number of goods produced per stroke of the operational mold system 10.

The operational system can be run until it is desired to once again stop and change products. Changing products is fairly common for a food processor in that they may have requests for 1.5, 1.75, 2, 2.4, 2.5, 3.1, 3.8, 4, 4.5 and/or 5 ounce patties of various formulations of meat requested by different consumers all of which may have different recipes being provided thereto along with different cooking requirements. This is just patties. This does not include different configurations of nuggets or other pressed items such as chicken fingers, country fried steak, and a whole host of other kinds of meat and other products which may also be provided on a single processing line.

Under normal test conditions the mold plate could be a half inch. The test spacers 52,54 could have a height 94 of 1¼ inches and a combined height of the mold plate 62 and test breather plate 66 and filler plate 84 if utilized could have a combined height of slightly less than 1¼ inches. As long as the height of the spacers 52,54 is less than 1¼ inches, then special nuts are not required, however, it is entirely possible that spacers higher than 1¼ inches could be employed, possibly using a special nut as known in the art to connect to the threaded studs which are received in the bores 120,122,124, 126.

In the preferred method of use, a method of testing a pressed food product in a food processing system having a press which directs food product from below into a cavity of a mold plate with a breather plate thereabove the cavity is provided. The mold plate reciprocates relative to the breather plate once filled and a knockout punch expels the pressed food product from the cavity once filled. The method includes the step of installing opposing test spacers in the press with the test spacers having a combined width greater than a width of a test mold plate and installing a test mold plate having at least one test cavity with the test breather plate above the test mold plate. Then the press is operated to expel food from the test mold plate. Further processing of the pressed food is conducted to at least verify settings for upstream and/or downstream processing. Next, the test mold station is removed and an operational mold station is installed with operational spacers and operational breather plates. The operational mold plate is greater in width than the combined width of the operational spacers. The operational mold plate has at least one more cavity than the test mold plate. Then the operating the operational system can be performed after at least verified operational settings, if not after adjusting for desired performance.

It is further anticipated that the test mold plate will have at least one or more similarly configured cavities as the pressed food products from the operational mold plate which are knocked out with the punches 96,20. The pressed food products 98,22,24 preferably will continue on to a conveyor to downstream processing. It is further anticipated that at least upstream settings will be verified during the testing process and that during the process at least one of breading, battering, seeding and cooking such as by frying will occur.

It is further anticipated that a filler plate may be utilized above the breather plate in some embodiments. A different connection system is preferably utilized to connect the test mold plate to the press 104 than operational mold plate 12 connects to press 104.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method of sampling a pressed food product in a food processing line having a press which normally directs food from below into an operational molding station comprising operational spacers, said station having an operational mold plate with a plurality of cavities, an operational breather plate above said cavities, said operational mold plate moveable relative to said breather plate, and a knockout punch expelling a pressed food product from said cavities once filled; said method comprising the steps of:
   a. removing said operational molding station, said operational mold and said operational breather plate from said press;
   b. installing a test molding station comprising opposing test spacers on said press, installing a test mold plate having at least one cavity, and installing a test breather plate above said test mold plate, wherein said test spacers have a combined width greater than the width of said test mold plate;
c. operating the press and expelling a pressed food product from the test mold plate;
d. further, at least partially processing the pressed food downstream of said press to at least verify operational settings for downstream processing steps; and
e. removing said test mold station, said test mold, and said test breather plate, and reinstalling said operational molding station and operational spacers, said operational mold plate, and said operational breather plate, said operational mold plate being greater in width than a combined width of the operational spacers and said operational mold plate having at least one more cavity than said test mold plate.

2. The method of claim 1 wherein when installing the test mold plate, the width of the test mold plate is about the width of the test spacer.

3. The method of claim 1 wherein when installing the test mold plate, the width of the test mold plate is less than the width of the test spacer.

4. The method of claim 1 wherein the test spacers further comprise receivers and the test breather has ears extending laterally therefrom into the receivers of the test spacers when installed in the installation step.

5. The method of claim 1 wherein the at least one more cavity in the operational mold plate is similarly configured to a cavity in the test mold plate when installed.

6. The method of claim 1 wherein in the step of expelling pressed food from the test mold plate, a knock out punch contacts the pressed food to assist in expelling the pressed food onto a conveyor directing the pressed food to further processing steps.

7. The method of claim 1 further comprising the step of verifying operational settings upstream of the press during sampling method.

8. The method of claim 1 wherein one of the operational settings at least verified relates to the breading of food products after expelling pressed food from the press.

9. The method of claim 1 wherein one of the operational settings at least verified relates to the battering of food products after expelling pressed food from the press.

10. The method of claim 1 wherein one of the operational settings at least verified relates to the cooking of food products after expelling pressed food from the press.

11. The method of claim 10 wherein one of the operational settings at least verified relates to the frying of food products after expelling pressed food from the press.

12. The method of claim 7 wherein one of the operational settings at least verified relates of the seeding of food prior to the step of pressing with the press.

13. The method of claim 1 further comprising the step of locating a test filler plate above the test breather plate during a portion the sampling method.

* * * * *